(12) United States Patent
Chakraborty et al.

(10) Patent No.: US 9,441,462 B2
(45) Date of Patent: *Sep. 13, 2016

(54) NANOCOMPOSITES FOR ABSORPTION TUNABLE SANDSCREENS

(75) Inventors: Soma Chakraborty, Houston, TX (US); Michael H. Johnson, Katy, TX (US); Gaurav Agrawal, Aurora, CO (US)

(73) Assignee: BAKER HUGHES INCORPORATED, Houston, TX (US)

( * ) Notice: Subject to any disclaimer, the term of this patent is extended or adjusted under 35 U.S.C. 154(b) by 584 days.

This patent is subject to a terminal disclaimer.

(21) Appl. No.: 13/348,090

(22) Filed: Jan. 11, 2012

(65) Prior Publication Data

US 2013/0175026 A1  Jul. 11, 2013

(51) Int. Cl.
 *E21B 43/08* (2006.01)
 *B29C 44/04* (2006.01)
 *B82Y 30/00* (2011.01)
 (Continued)

(52) U.S. Cl.
 CPC .............. *E21B 43/08* (2013.01); *B29C 44/02* (2013.01); *B82Y 30/00* (2013.01); *C08J 9/0071* (2013.01); *B29K 2075/00* (2013.01); *B29K 2105/045* (2013.01); *B29K 2105/162* (2013.01); *B29K 2105/24* (2013.01); *B29K 2995/0068* (2013.01); *B29K 2995/0092* (2013.01); *B29K 2995/0093* (2013.01); *B29L 2031/14* (2013.01); *C08J 2205/05* (2013.01)

(58) Field of Classification Search
 CPC ... C08J 9/0071; C08J 2205/05; B82Y 30/00; E21B 43/08; B29C 44/04; B29C 44/02; B29K 2105/162; B29K 2995/0068; B29K 2995/0092; B29K 2105/045; B29K 2075/00; B29K 2995/0093; B29K 2105/24; B29L 2031/14

USPC ...... 210/497.01, 499, 510.1; 264/41, 45, 49, 264/45.1; 166/227, 228; 977/902, 773
See application file for complete search history.

(56) References Cited

U.S. PATENT DOCUMENTS 3,404,061 A   10/1968   Shane et al.
4,774,990 A   10/1988   Yamamoto et al.
(Continued)

FOREIGN PATENT DOCUMENTS

KR   10-2004-0095581 A   11/2004
KR   10-0620615 B1   9/2006
(Continued)

OTHER PUBLICATIONS

Thierry Cassagneau et al., "Preparation and Characterization of Ultrathin Films Layer-by-Layer Self-Assembled from Graphite Oxide Nanoplatelets and Polymers"; Langmuir 2000 16 (18), 7318-7324.

Aravind Dasari et al., "Fundamental aspects and recent progress on wear/scratch damage in polymer nanocomposites," Materials Science and Engineering R 63 (2009) 31-80.

Christopher A. Dyke et al., "Covalent Functionalization of Single-Walled Carbon Nanotubes for Materials Applications," The Journal of Physical Chemistry; vol. 108, No. 51, Dec. 23, 2004, pp. 11151-11159.

(Continued)

*Primary Examiner* — Madeline Gonzalez
(74) *Attorney, Agent, or Firm* — Cantor Colburn LLP

(57) ABSTRACT

A downhole filter comprising includes an open cell foam; and nanoparticles disposed in the open cell foam and exposed within pores of the open cell foam. A method of preparing the downhole filter includes combining a polyisocyanate and polyol to form a polymer composition; introducing nanoparticles into the polymer composition; and foaming the polymer composition to produce the downhole filter comprising an open cell foam having nanoparticles exposed within pores of the open cell foam. The nanoparticles can be derivatized with functional groups.

26 Claims, 2 Drawing Sheets

(51) Int. Cl.
*C08J 9/00* (2006.01)
*B29C 44/02* (2006.01)
*B29K 105/16* (2006.01)
*B29K 105/04* (2006.01)
*B29L 31/14* (2006.01)
*B29K 75/00* (2006.01)
*B29K 105/24* (2006.01)

(56) References Cited

U.S. PATENT DOCUMENTS

| | | | |
|---|---|---|---|
| 5,279,873 | A | 1/1994 | Oike |
| 6,882,094 | B2 | 4/2005 | Dimitrijevic et al. |
| 7,048,048 | B2 | 5/2006 | Nguyent et al. |
| 7,112,361 | B2 | 9/2006 | Lynn et al. |
| 7,745,528 | B2 | 6/2010 | Prud'Homme et al. |
| 8,876,944 | B2 * | 11/2014 | Ren .................. E21B 43/082 95/241 |
| 9,115,580 | B2 * | 8/2015 | Mazyar .............. E21B 43/385 |
| 2004/0013597 | A1 | 1/2004 | Mao et al. |
| 2004/0018364 | A1 | 1/2004 | Ota et al. |
| 2004/0053037 | A1 | 3/2004 | Koch et al. |
| 2004/0229983 | A1 | 11/2004 | Winowiecki |
| 2005/0001317 | A1 | 1/2005 | Ganapathiraman et al. |
| 2005/0070655 | A1 | 3/2005 | Van Den Bergen et al. |
| 2005/0161212 | A1 | 7/2005 | Leismer et al. |
| 2006/0199770 | A1 | 9/2006 | Bianco et al. |
| 2007/0003471 | A1 | 1/2007 | Kawabata |
| 2007/0237546 | A1 | 10/2007 | Zona et al. |
| 2007/0284557 | A1 | 12/2007 | Gruner et al. |
| 2008/0087431 | A1 | 4/2008 | Willauer et al. |
| 2008/0127475 | A1 | 6/2008 | Griffo |
| 2008/0149363 | A1 | 6/2008 | Han et al. |
| 2008/0220282 | A1 | 9/2008 | Jang et al. |
| 2009/0036605 | A1 * | 2/2009 | Ver Meer .................. 525/55 |
| 2009/0155578 | A1 | 6/2009 | Zhamu et al. |
| 2009/0198009 | A1 | 8/2009 | Matsuki et al. |
| 2009/0308520 | A1 | 12/2009 | Shin et al. |
| 2010/0021708 | A1 | 1/2010 | Kong et al. |
| 2010/0047154 | A1 | 2/2010 | Lee et al. |
| 2010/0059726 | A1 | 3/2010 | Jung et al. |
| 2010/0096595 | A1 | 4/2010 | Prud'Homme et al. |
| 2010/0096597 | A1 | 4/2010 | Prud'Homme et al. |
| 2010/0130701 | A1 | 5/2010 | Lahdensuo |
| 2010/0159366 | A1 | 6/2010 | Shao-Horn et al. |
| 2010/0163844 | A1 | 7/2010 | Ermolov |
| 2010/0178464 | A1 | 7/2010 | Choi et al. |
| 2010/0179645 | A1 | 7/2010 | Chen et al. |
| 2010/0314118 | A1 * | 12/2010 | Quintero et al. .......... 166/308.1 |
| 2011/0067872 | A1 * | 3/2011 | Agrawal .................. 166/302 |
| 2011/0091560 | A1 * | 4/2011 | Smith et al. .................. 424/489 |
| 2011/0200674 | A1 * | 8/2011 | MacKay .................. 424/486 |
| 2011/0232901 | A1 | 9/2011 | Carrejo et al. |

FOREIGN PATENT DOCUMENTS

| | | | |
|---|---|---|---|
| KR | 10-2007-0053164 | A | 5/2007 |
| KR | 10-2009-0014186 | A | 2/2009 |
| KR | 10-2009-0086536 | A | 8/2009 |
| KR | 1020110053012 | A | 5/2011 |
| WO | 03/103854 | A1 | 12/2003 |
| WO | 2007098578 | A1 | 9/2007 |
| WO | 2008/048705 | A2 | 4/2008 |
| WO | 2008045778 | A1 | 4/2008 |
| WO | 2008097343 | A2 | 8/2008 |
| WO | 2010002770 | A1 | 1/2010 |
| WO | 2010147860 | A1 | 12/2010 |

OTHER PUBLICATIONS

Jinni Deng et al., "Mechanical and Surface Properties of Polyurethane/Fluorinated Multi-Walled Carbon Nanotubes Composites," Journal of Applied Polymer Science DOI 10.1002/app.27625, Published online Feb. 4, 2008 in Wiley InterScience (www.interscience. wiley.com), pp. 2023-2028.

International Search Report and Written Opinion for International Application No. PCT/US2011/043033; Mailed Mar. 22, 2012; 11 pages.

International Search Report and Written Opinion for International Application No. PCT/US2011/050956; Mailed Apr. 30, 2012; 10 pages.

N. V. Sirotinkin et al., "Model of Formation of Three-Dimensional Polyurethane Films Modified by Detonation Nanodiamonds," Physics of the Solid State, vol. 46, No. 4, 2004, pp. 746-747. Translated from Fizika Tverdogo Tela, vol. 46, No. 4, 2004, pp. 725-726.

International Search Report and Written Opinion; Internation Application No. PCT/US2012/069098; International Filing Date: Dec. 12, 2012; Date of Mailing: Mar. 15, 2013; 12 pages.

Mitchell et al. "Dispersion of Functionalized Carbon Nanotubes in Polystyrene", Macromolecules 2002, 35, 8825-8830.

Extended European Search Report for related EP Application No. 11745232.6-1303 / 2536561, dated Feb. 6, 2014, pp. 1-8.

Nina I. Kovtyukhova, et. al.; Layer-by-Layer Assembly of Ultrathin Composite Films from Micron-Sized Graphite Oxide Sheets and Polycations; Chem. Mater, vol. 11; 1999; pp. 771-778.

Pekker, et al. Hydrogenation of Carbon Nanotubes and Graphite in Liquid Ammonia, J. Phys. Chem. B. 2001; 105: 7938-7943.

Scientific Background on the Nobel Prize in Physics 2010—Graphene-compiled by the Class for Physics of the Royal Swedish Academy of Sciences, The Royal Swedish Academy of Sciences, pp. 1-10 (Oct. 5, 2010).

Singh, et al. Organic functionalization and characterization of single-walled carbon nanotubes, Chemical Society Reviews 2009; 38: 2214-2230.

William S. Hummers Jr., et. al.; Preparation of Graphitic Oxide; 1957; p. 1339.

Borondics et al., "Functionalization of Carbon Nanotubes Via Dissolving Metal Reductdions," Journal of Nanoscience and Nanotechnology; 7; pp. 1551-1559; (2007).

Busick et al., "Effects of graphite content on the morphology and barrier properties of poly(vinylidene fluoride) composites," Polymer 40: pp. 6023-6029 (1999).

Chakraborty et al., "Reductive Alkylation of Fluorinated Graphite"; Chem. Mater.; 20; pp. 3134-3136; (2008).

Chattopadhyay et al., "Carbon Nanotube Salts. Arylation of Single-Wall Carbon Nanotubes"; Organic Letters; 7 (19); pp. 4067-4069; (2005).

Hannes C. Schniepp et al., "Functionalized Single Graphene Sheets Derived from Splitting Graphite Oxide," The Journal of Physical Chemistry Letters, vol. 110; 2006; pp. 8535-8539.

Lee et al., "Layer-by-Layer Assembly of All Carbon Nanotube Ultrathin Films for Electrochemical Applications," J. Am. Chem. Soc., 131 (2); pp. 671-679; (2009).

Liang et al., "A Convenient Route to Functionalized Carbon Nanotubes"; Nano Letters; 4(7); pp. 1257-1260; (2004).

Sasha Stankovich et al., "Graphene-based composite materials", Nature 04969, vol. 442; 2006; pp. 282-286.

Shen et al., "Layer-by-Layer Self-Assembly of Graphene Nanoplatelets", Langmuir; 25(11), pp. 61-22-6128; (2009).

Stephenson et al., "Highly Functionalized and Soluble Multiwalled Carbon Nanotubes by Reductive Alkylation and Arylation: The Billups Reaction", Chem. Mater. 18, pp. 4658-4661; (2006).

Woo-Sik Jang et al., "Layer-by-layer assembly of thin film oxygen barrier," Thin Solid Films, vol. 516; 2008; pp. 4819-4825.

International Search Report and Written Opinion; International Application No. PCT/US2012/0024094; International Filing Date: Feb. 7, 2012; Date of Mailing: Sep. 3, 2012; 7 pages.

Office Action for related Gulf Co-Operation Application No. GC 2011-17807, dated Sep. 21, 2014, pp. 1-18.

Liu et al., "Graphene-Based Supercapacitor with an Ultrahigh Energy Density", Nano. Lett. 2010, 10, pp. 4863-4868.

Chattopadhyay, et al, Carbon Nanotubes Salts. Arylation of Single-Wall Carbon Nanotubes, Rice Univ., Apr. 2005, p. 4067-4069.

Dyke, et al., Covalent FUnctinaliztion of Single-Walled CArbon Nanotubes for Materilas Application, American Chemical Society, Sep. 2004, p. 11151-11159.

Viory et al., "Dissolution and alkylation of industrially produced multiwalled carbon nanotubes", Carbon, 49, 1, pp. 170-175, Jan. 1, 2011.

* cited by examiner

NANOCOMPOSITES FOR ABSORPTION TUNABLE SANDSCREENS

BACKGROUND

A downhole environment, such as, for example, an oil or gas well in an oilfield or undersea environment, a geothermal borehole, a carbon dioxide sequestration hole, and other such downhole environments, subjects equipment used in these environments to severe conditions of temperature, pressure, or corrosiveness. Further, equipment used in these environments can be located thousands of feet from the surface posing recovery issues of the equipment. A particular issue concerning fluid production from a downhole environment is that fluids within a formation contain a combination of components, some of which are desired for production while others are not. Yet another concern for fluid production is intrusion of particulate matter, for example, rock debris and sand, into the borehole from the formation. Particle production can result in premature failure of downhole and surface equipment. Moreover, particles, e.g., sand can build up in production tubing and obstruct bore flow. Additionally, production of undesired fluids or particles can be problematic to handle and dispose of at the surface.

Sandscreens have been used downhole to filter particles from fluids with varying success. However, the filtration medium in many sandscreens is a metallic mesh or screen that operates based on particle size exclusion and therefore removes some particulates, but not all particulate matter. Consequently, alternative materials and constructions for downhole filters would be well-received in the art.

BRIEF DESCRIPTION

The above and other deficiencies of the prior art are overcome by, in an embodiment, a downhole filter comprising an open cell foam; and nanoparticles disposed in the open cell foam and exposed within pores of the open cell foam.

In an embodiment, a method of preparing the downhole filter comprises combining a polyisocyanate and polyol to form a polymer composition; introducing nanoparticles into the polymer composition; and foaming the polymer composition to produce the downhole filter comprising an open cell foam having nanoparticles exposed within pores of the open cell foam.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
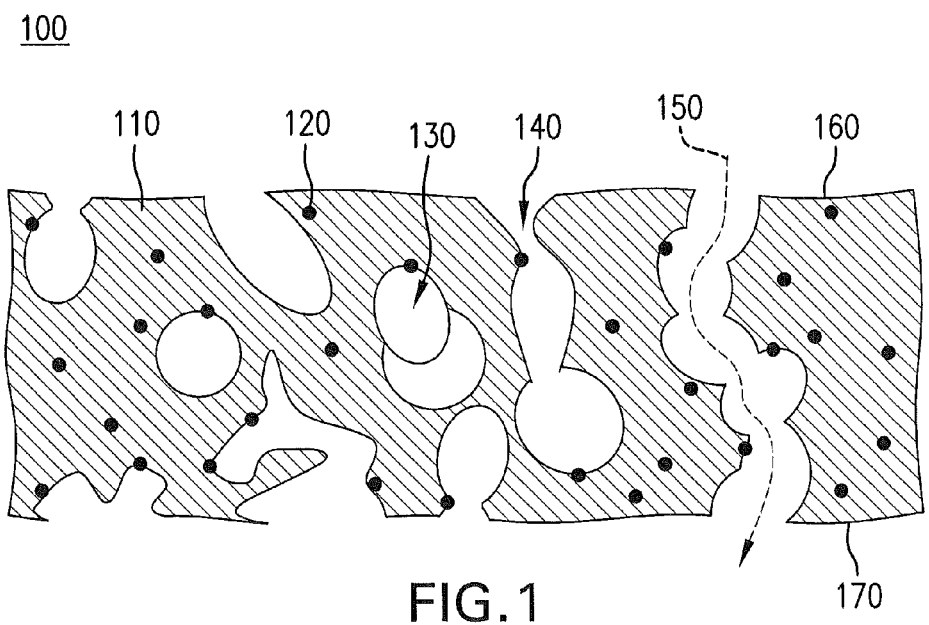
FIG. 1 shows a cross-section of an open cell foam.

A detailed description of one or more embodiments of the disclosed apparatus and method are presented herein by way of exemplification and not limitation with reference to the Figures.

Disclosed herein is a downhole filter that includes a polymer nanocomposite formed of a polymer and a nanoparticle, which in some circumstances is derivatized. It has surprisingly been found that the nanoparticles play a role in the size of the pores in an open cell foam containing the polymer nanocomposite materials and that derivatization of the nanoparticles selectively controls absorption by the open cell foam. In this manner, the open cell foam can be deployed downhole to control particulate production and fluid flow rate.

According to an embodiment, a downhole filter includes an open cell foam and nanoparticles disposed in the open cell foam. The nanoparticles can be exposed within pores of the open cell foam. Additionally, the nanoparticles can be disposed among the chains of a polymer contained in the open cell foam to be unexposed in the pores of the open cells. The downhole filter is, for example, a sandscreen, but is not limited thereto, e.g., the downhole filter can be used in numerous applications involving filtering a fluid in a downhole environment such as a filter for a circulation pump.

The open cell foam includes a base polymer and nanoparticles. The nanoparticles can be non-derivatized or derivatized to include chemical functional groups to increase dispersibility, reactivity, surface properties, compatibility, and other desirable properties. Combinations comprising derivatized and non-derivatized nanoparticles can also be used.

In an embodiment, the base polymer of the open cell foam is polyurethane. Polyurethane in general is a condensation product of a di- or polyisocyanate and a di- or polyhydroxy compound (also referred to as diol or polyol herein). A chain extender, for example, chain extenders based on di- or polyamines, alternatively or in addition to diols can be included in place of part of the diol charge to form the base polymer. The diol, polyol, diisocyanate, poliisocyante, chain extender, and other species that react to form the base polymer are referred to collectively as reactive monomers.

Di- and polyhydroxy compounds can include, for example, diols and polyols having from 2 to 30 carbon atoms. Useful diols include glycols including oligomeric glycols having repeating alkyleneoxy units including di-, tri- and higher glycols, or polyglycols. Exemplary diols may include ethylene glycol, propylene glycol, trimethylene glycol, 1,3-butanediol, 1,4-butanediol, bishydroxymethyl cyclohexane, neopentylglycol, diethylene glycol, hexanediol, dipropylene glycol, tripropylene glycol, polypropylene glycol, triethylene glycol, polyethylene glycol, tetraethylene glycol, oligomeric and polymeric glycols such as polyethylene glycols, polypropylene glycols, polybutylene glycols, poly(ethylene-propylene)glycols, and the like. Combinations comprising at least one of the foregoing dihydroxy compounds can be used.

Exemplary suitable polyols include triols, for example glycerol, trimethylol propane, pentaerythritol, tris(2-hydroxyethyl)isocyanurate, and the like; tetrols such as dipentaerythritol; and other sugar alcohols such as inositol, myo-inositol, sorbitol, and the like. Combinations comprising at least one of the foregoing polyhydroxy compounds can be used.

Polyurethanes are typically prepared by the condensation of a diisocyanate with a diol. Aliphatic polyurethanes having at least two urethane moieties per repeating unit are useful, wherein the diisocyanate and diol used to prepare the polyurethane comprise divalent aliphatic groups that may be the same or different. The divalent aliphatic units can be C2 to C30, specifically C3 to C25, more specifically C4 to C20 alkylene groups, including straight chain alkylene, branched chain alkylene, cycloalkylene, heteroalkylene such as oxyalkylene (including polyetheralkylene), and the like. Exemplary aliphatic diradical groups include but are not limited to ethylene; 1,2- and 1,3-propylene; 1,2-, 1,3-, and 1,4-butylene; 1,5-pentamethylene; 1,3-(2,2-dimethyl)propylene; 1,6-hexamethylene; 1,8-octamethylene; 1,5-(2,2,4-trimethyl) pentylene, 1,9-nonamethylene; 1,6-(2,2,4-trimethyl) hexylene; 1,2-, 1,3-, and 1,4-cyclohexylene; 1,4-dimethylene cyclohexane; 1,11-undecamethylene; 1,12-dodecamethylene, and the like.

Monomeric diisocyanates may be used to prepare the polyurethane. The diisocyanate component may be a monomeric C4-20 aliphatic or C4-20 aromatic diisocyanate. Exemplary aliphatic diisocyanates include isophorone diisocyanate; dicyclohexylmethane-4,4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-decamethylene diisocyanate; 2,2,4-trimethyl-1,5-pentamethylene diisocyanate; 2,2'-dimethyl-1,5-pentamethylene diisocyanate; 3-methoxy-1,6-hexamethylene diisocyanate; 3-butoxy-1,6-hexamethylene diisocyanate; ω, ω'-dipropylether diisocyanate; 1, 4-cyclohexyl diisocyanate; 1,3-cyclohexyl diisocyanate; trimethylhexamethylene diisocyanate; and combinations comprising at least one of the foregoing.

Exemplary aromatic polyisocyanates include toluene diisocyanate, methylene bis-phenylisocyanate (diphenylmethane diisocyanate), methylene bis-cyclohexylisocyanate (hydrogenated MDI), naphthalene diisocyanate, and the like.

Polymeric or oligomeric diisocyanates can also or alternatively be used to prepare a polyurethane or a urethane- or urea-linked copolymer. Exemplary oligomeric or polymeric chains for the polymeric diisocyanates include polyurethanes, polyethers, polyester, polycarbonate, polyestercarbonates, and the like. In an embodiment, the polyisocyanate is a polymeric polyisocyanate, such as a polymer chain with terminal isocyanate groups. Useful polyisocyanates include those based on polyesters such as polyaliphatic esters including polylactones, polyarylate esters including copolymers of phthalates with phenols such as bisphenol A, dihydroxybenzenes, and the like; and poly(aliphatic-aromatic) esters such as ethylene terephthalate, butylene terephthalate, and the like.

A useful class of polyaliphatic ester-based diisocyanates is based on polylactones such as polybutyrolactones, polycaprolactones, and the like. Exemplary polyester-diisocyanates based on these polyesters include ADIPRENE® LFP 2950A and PP 1096, available from Chemtura, which are p-phenylene diisocyanate (PPDI)-terminated polycaprolactone prepolymers.

Alternatively or in addition to a dihydroxy compound, the diisocyanate may be condensed with a diamine, sometimes referred to as a chain extender. It will be appreciated that condensation of a diisocyanate with a dihydroxy compound produces a urethane linkage in the polymer backbone, whereas the condensation of diisocyanate with the diamine produces a urea linkage in the polymer backbone. Exemplary chain extenders include C4-30 diamines. The diamines may be aliphatic or aromatic. In a specific embodiment, useful diamines include aromatic diamines such as, for example, 4,4'-bis(aminophenyl)methane, 3,3'-dichloro-4,4'-diaminodiphenyl methane (also referred to as 4,4'-methylene-bis(o-chloroaniline), abbreviated MOCA), dimethylsulfidetoluene diamine (DADMT), and the like.

In addition to the polyurethane base polymer described above, the open cell foam includes nanoparticles. In an embodiment, the nanoparticles are non-derivatized, derivatized with functional groups, or a combination comprising at least one of the foregoing. Nanoparticles, from which the derivatized nanoparticles are formed, are generally particles having an average particle size, in at least one dimension, of less than one micrometer (μm). As used herein "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. Nanoparticles may include both particles having an average particle size of 250 nanometers (nm) or less, and particles having an average particle size of greater than 250 nm to less than 1 μm (sometimes referred in the art as "sub-micron sized" particles). In an embodiment, a nanoparticle may have an average particle size of about 0.5 nm to about 500 nm, specifically about 0.5 nm to about 250 nm, more specifically about 0.5 nm to about 150 nm, even more specifically about 0.5 nm to about 125 nm, and still more specifically about 1 nm to about 75 nm. The nanoparticles may be monodisperse, where all particles are of the same size with little variation, or polydisperse, where the particles have a range of sizes and are averaged. Generally, polydisperse nanoparticles are used. Nanoparticles of different average particle size may be used, and in this way, the particle size distribution of the nanoparticles may be unimodal (exhibiting a single distribution), bimodal exhibiting two distributions, or multimodal, exhibiting more than one particle size distribution.

The minimum particle size for the smallest 5 percent of the nanoparticles may be less than 1 nm, specifically less than or equal to 0.8 nm, and more specifically less than or equal to 0.7 nm. Similarly, the maximum particle size for 95% of the nanoparticles is greater than or equal to 900 nm, specifically greater than or equal to 750 nm, and more specifically greater than or equal to 500 nm.

The nanoparticles have a high surface area of greater than 300 $m^2/g$, and in a specific embodiment, 300 $m^2/g$ to 1800 $m^2/g$, specifically 500 $m^2/g$ to 1500 $m^2/g$.

The nanoparticles disclosed herein comprise a fullerene, a nanotube, nanographite, nanographene, graphene fiber, nanodiamonds, polysilsesquioxanes, silica nanoparticles, nano clay, metal particles, ceramic particles, or a combination comprising at least one of the foregoing.

Fullerenes, as disclosed herein, may include any of the known cage-like hollow allotropic forms of carbon possessing a polyhedral structure. Fullerenes may include, for example, from about 20 to about 100 carbon atoms. For example, $C_{60}$ is a fullerene having 60 carbon atoms and high symmetry ($D_{5h}$), and is a relatively common, commercially available fullerene. Exemplary fullerenes may include $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanotubes can include carbon nanotubes, inorganic nanotubes, metallated nanotubes, or a combination comprising at least one of the foregoing. Carbon nanotubes are tubular fullerene structures having open or closed ends, can be inorganic or made entirely or partially of carbon, and can include other components such as metals or metalloids. Nanotubes, including carbon nanotubes, can be single walled nanotubes (SWNTs) or multi-walled nanotubes (MWNTs).

Nanographite is a cluster of plate-like sheets of graphite, in which a stacked structure of one or more layers of graphite, which has a plate-like two dimensional structure of fused hexagonal rings with an extended delocalized π-electron system, are layered and weakly bonded to one another through π-π stacking interaction. Nanographite has both micro- and nano-scale dimensions, such as for example an average particle size of 1 to 20 μm, specifically 1 to 15 μm; and an average thickness (smallest) dimension in nano-scale dimensions of less than 1 μm, specifically less than or equal to 700 nm, and still more specifically less than or equal to 500 nm.

In an embodiment, the nanoparticle is a graphene including nanographene and graphene fibers (i.e., graphene particles having an average largest dimension of greater than 1 mm and an aspect ratio of greater than 10, where the graphene particles form an interbonded chain). Graphene and nanographene, as disclosed herein, are effectively two-dimensional particles of nominal thickness, having of one or more layers of fused hexagonal rings with an extended delocalized π-electron system, layered and weakly bonded to one another through π-π stacking interaction. Graphene in general, and including nanographene, may be a single sheet or a stack of several sheets having both micro- and nano-scale dimensions, such as in some embodiments an average particle size of 1 to 20 μm, specifically 1 to 15 μm, and an average thickness (smallest) dimension in nano-scale dimensions of less than or equal to 50 nm, specifically less than or equal to 25 nm, and more specifically less than or equal to 10 nm. An exemplary nanographene can have an average particle size of 1 to 5 μm, and specifically 2 to 4 μm. In addition, smaller nanoparticles or sub-micron sized particles as defined above may be combined with nanoparticles having an average particle size of greater than or equal to 1 μm. In a specific embodiment, the derivatized nanoparticle is a derivatized nanographene.

Graphene, including nanographene, may be prepared by exfoliation of nanographite or by a synthetic procedure by "unzipping" a nanotube to form a nanographene ribbon, followed by derivatization of the nanographene to prepare, for example, nanographene oxide.

Exfoliation to form graphene or nanographene may be carried out by exfoliation of a graphite source such as graphite, intercalated graphite, and nanographite. Exemplary exfoliation methods include, but are not limited to, those practiced in the art such as fluorination, acid intercalation, acid intercalation followed by thermal shock treatment, and the like, or a combination comprising at least one of the foregoing. Exfoliation of the nanographite provides a nanographene having fewer layers than non-exfoliated nanographite. It will be appreciated that exfoliation of nanographite may provide the nanographene as a single sheet only one molecule thick, or as a layered stack of relatively few sheets. In an embodiment, exfoliated nanographene has fewer than 50 single sheet layers, specifically fewer than 20 single sheet layers, specifically fewer than 10 single sheet layers, and more specifically fewer than 5 single sheet layers.

Polysilsesquioxanes, also referred to as polyorganosilsesquioxanes or polyhedral oligomeric silsesquioxanes (POSS) derivatives are polyorganosilicon oxide compounds of general formula $RSiO_{1.5}$ (where R is an organic group such as methyl) having defined closed or open cage structures (closo or nido structures). Polysilsesquioxanes, including POSS structures, may be prepared by acid and/or base-catalyzed condensation of functionalized silicon-containing monomers such as tetraalkoxysilanes including tetramethoxysilane and tetraethoxysilane, and alkyltrialkoxysilanes such as methyltrimethoxysilane and methyltrimethoxysilane.

Nanoclays can be used in the open cell foam. Nanoclays may be hydrated or anhydrous silicate minerals with a layered structure and may include, for example, aluminosilicate clays such as kaolins including hallyosite, smectites including montmorillonite, illite, and the like. Exemplary nanoclays include those marketed under the tradename CLOISITE® marketed by Southern Clay Additives, Inc. Nanoclays can be exfoliated to separate individual sheets, can be non-exfoliated, and further, can be dehydrated or included as hydrated minerals. Other nano-sized mineral fillers of similar structure may also be included such as, for example, talc, micas including muscovite, phlogopite, or phengite, or the like.

Inorganic nanoparticles such as ceramic particles can also be included in the open cell foam. Exemplary inorganic nanoparticles may include a metal or metalloid carbide such as tungsten carbide, silicon carbide, boron carbide, or the like; a metal of metalloid oxide such as alumina, silica, titania, zirconia, or the like; a metal or metalloid nitride such as titanium nitride, boron nitride, silicon nitride, or the like; and/or a metal nanoparticle such as iron, tin, titanium, platinum, palladium, cobalt, nickel, vanadium, alloys thereof, or a combination comprising at least one of the foregoing.

A nanodiamond is a diamond particle having an average particle size of less than 1 μm. Nanodiamonds are from a naturally occurring source, such as a by-product of milling or other processing of natural diamonds, or are synthetic and are prepared by any suitable method such as commercial methods involving detonation synthesis of nitrogen-containing carbon compounds (e.g., a combination of trinitrotoluene (TNT) and cyclotrimethylenetrinitramine (RDX)).

The nanoparticles used herein can be derivatized to include a functional group, non-derivatized, or can be a combination comprising at least one of the foregoing. Exemplary functional group include carboxy (e.g., carboxylic acid groups), epoxy, ether, ketone, amine, hydroxy, alkoxy, alkyl, aryl, aralkyl, alkaryl, lactone, functionalized polymeric or oligomeric groups, or a combination comprising at least one of the forgoing functional groups. Such functional groups can be ionic. In a non-limiting embodiment, the nanoparticles are a combination of non-derivatized nanoparticles and nanoparticles derivatized with a carboxylic acid group, wherein some of the functional groups are de-protonated as a carboxylate group. The nanoparticles, including nanographene after exfoliation, are derivatized to introduce chemical functionality to the nanoparticle. For example, for nanographene, the surface and/or edges of the nanographene sheet is derivatized to increase dispersibility in and interaction with the polymer matrix. In an embodiment, the derivatized nanoparticle may be hydrophilic, hydrophobic, olephilic, olephobic, oxophilic, lipophilic, or may possess a combination of these properties to provide a balance of desirable net properties, by use of different functional groups.

In an embodiment, the nanoparticle is derivatized by, for example, amination to include amine groups, where amination may be accomplished by nitration followed by reduction, or by nucleophilic substitution of a leaving group by an amine, substituted amine, or protected amine, followed by deprotection as necessary. In another embodiment, the nanographene can be derivatized by oxidative methods to produce an epoxy, hydroxy group or glycol group using a peroxide, or by cleavage of a double bond by, for example, a metal mediated oxidation such as a permanganate oxidation to form ketone, aldehyde, or carboxylic acid functional groups.

Where the functional groups for the derivatized nanoparticles are alkyl, aryl, aralkyl, alkaryl, functionalized polymeric or oligomeric groups, or a combination of these groups, the functional groups can be attached (a) directly to the derivatized nanoparticle by a carbon-carbon bond without intervening heteroatoms, to provide greater thermal and/or chemical stability to the derivatized nanoparticle as well as a more efficient synthetic process requiring fewer steps; (b) by a carbon-oxygen bond (where the nanoparticle contains an oxygen-containing functional group such as hydroxy or carboxylic acid); or (c) by a carbon-nitrogen bond (where the nanoparticle contains a nitrogen-containing functional group such as amine or amide). In an embodiment, the nanoparticle can be derivatized by a metal mediated reaction with a $C_{6-30}$ aryl or $C_{7-30}$ aralkyl halide (F, Cl, Br, I) in a carbon-carbon bond forming step, such as by a palladium-mediated reaction such as the Stille reaction, Suzuki coupling, or diazo coupling, or by an organocopper coupling reaction. In another embodiment, a nanoparticle, such as a fullerene, nanotube, nanodiamond, or nanographene, may be directly metallated by reaction with, e.g., an alkali metal such as lithium, sodium, or potassium, followed by reaction with a $C_{1-30}$ alkyl or $C_{7-30}$ alkaryl compound with a leaving group such as a halide (Cl, Br, I) or other leaving group (e.g., tosylate, mesylate, etc.) in a carbon-carbon bond forming step. The aryl or aralkyl halide, or the alkyl or alkaryl compound, may be substituted with a functional group such as hydroxy, carboxy, ether, or the like. Exemplary groups include, for example, hydroxy groups, carboxylic acid groups, alkyl groups such as methyl, ethyl, propyl, butyl, pentyl, hexyl, octyl, dodecyl, octadecyl, and the like; aryl groups including phenyl and hydroxyphenyl; aralkyl groups such as benzyl groups attached via the aryl portion, such as in a 4-methylphenyl, 4-hydroxymethylphenyl, or 4-(2-hydroxyethyl)phenyl (also referred to as a phenethylalcohol) group, or the like, or aralkyl groups attached at the benzylic (alkyl) position such as found in a phenylmethyl or 4-hydroxyphenyl methyl group, at the 2-position in a phenethyl or 4-hydroxyphenethyl group, or the like. In an exemplary embodiment, the derivatized nanoparticle is nanographene substituted with a benzyl, 4-hydroxybenzyl, phenethyl, 4-hydroxyphenethyl, 4-hydroxymethylphenyl, or 4-(2-hydroxyethyl)phenyl group or a combination comprising at least one of the foregoing groups.

In another embodiment, the nanoparticle can be further derivatized by grafting certain polymer chains to the functional groups. For example, polymer chains such as acrylic chains having carboxylic acid functional groups, hydroxy functional groups, and/or amine functional groups; polyamines such as polyethyleneamine or polyethyleneimine; and poly(alkylene glycols) such as poly(ethylene glycol) and poly(propylene glycol), may be included by reaction with functional groups.

The functional groups of the derivatized nanoparticle may react directly with other components in the open cell foam, including reactive functional groups that may be present in the polyurethane, other polymers (if present), or monomeric constituents, leading to improved tethering/reaction of the derivatized nanoparticle with the polymeric matrix. Where the nanoparticle is a carbon-based nanoparticle such as nanographene, a carbon nanotube, nanodiamond, or the like, the degree of derivatization for the nanoparticles can vary from 1 functional group for every 5 carbon centers to 1 functional group for every 100 carbon centers, depending on the functional group.

In an embodiment, in addition to the nanoparticles, the open cell foam can include filler particles such as carbon black, mica, clays such as e.g., montmorillonite clays, silicates, glass fiber, carbon fiber, and the like, and combinations comprising at least one of the foregoing fillers.

According to an embodiment, the open cell foam herein can include a surfactant to stabilize the nanoparticles. Useful surfactants include fatty acids of up to 22 carbon atoms such as stearic acids and esters and polyesters thereof, poly (alkylene glycols) such as poly(ethylene oxide), poly(propylene oxide), and block and random poly(ethylene oxide-propylene oxide) copolymers such as those marketed under the PLURONIC™ tradename by BASF. Other surfactants include polysiloxanes, such as homopolymers and copolymers of poly(dimethylsiloxane), including those having functionalized end groups, and the like. Other useful surfactants include those having a polymeric dispersant having poly(alkylene glycol) side chains, fatty acids, or fluorinated groups such as perfluorinated $C_{1-4}$ sulfonic acids grafted to the polymer backbone. Polymer backbones include those based on a polyester, a poly(meth)acrylate, a polystyrene, a poly(styrene-(meth)acrylate), a polycarbonate, a polyamide, a polyimide, a polyurethane, a polyvinyl alcohol, or a copolymer comprising at least one of these polymeric backbones. Additionally, the surfactant can be anionic, cationic, zwitterionic, or non-ionic. The surfactant can be present in the foam in an amount from about 0.05 wt. % to about 10 wt. %, specifically about 0.1 wt. % to about 10 wt. %, and more specifically about 1 wt. % to about 5 wt. %, based on the weight of the foam.

Exemplary anionic surfactants include but are not limited to alkyl sulfates, alkyl sulfonates, alkyl benzene sulfates, alkyl benzene sulfonates, fatty acids, sulfosuccinates, and phosphates. Exemplary cationic surfactants include but quaternary ammonium salts and alkylated pyridinium salts. Examples of nonionic surfactants include alkyl primary, secondary, and tertiary amines, alkanolamides, ethoxylated fatty alcohols, alkyl phenol polyethoxylates, fatty acid esters, glycerol esters, glycol esters, polyethers, alkyl polyglycosides, and amineoxides. Zwitterionic surfactants (which include a cationic and anionic functional group on the same molecule) include, for example, betaines, such as alkyl ammonium carboxylates (e.g., $[(CH_3)_3N^+—CH(R)COO^-]$ or sulfonates (sulfo-betaines) such as $[RN^+(CH_3)_2(CH_2)_3SO_3^-]$). Examples include n-dodecyl-N-benzyl-N-methylglycine $[C_{12}H_{25}N^+(CH_2C_6H_5)(CH_3)CH_2COO^-]$, N-allyl N-benzyl N-methyltaurines $[C_nH_{2n+1}N^+(CH_2C_6H_5)(CH_3)CH_2CH_2SO_3^-]$.

In an embodiment, the open cell foam includes (in addition to the base polymer polyurethane) an additional polymer to obtain mechanical and/or chemical properties effective for use of the open cell foam downhole, i.e., the additional polymer may be any polymer useful for forming a nanocomposite for downhole applications. The additional polymer can provide a hydrophobic or hydrophilic property to the open cell foam as well as providing elasticity or rigidity at a certain temperature. For example, the polymer may comprise a fluoroelastomer, perfluoroelastomer, hydrogenated nitrile butyl rubber, ethylene-propylene-diene monomer (EPDM) rubber, silicone, epoxy, polyetheretherketone, bismaleimide, polyethylene, polyvinyl alcohol, phenolic resin, nylon, polycarbonate, polyester, polyphenylene sulfide, polyphenylsulfone, tetrafluoroethylene-propylene elastomeric copolymer, or a combination comprising at least one of the foregoing polymers.

Exemplary polymers include phenolic resins such as those prepared from phenol, resorcinol, o-, m- and p-xylenol, o-, m-, or p-cresol, and the like, and aldehydes such as formaldehyde, acetaldehyde, propionaldehyde, butyraldehyde, hexanal, octanal, dodecanal, benzaldehyde, salicylaldehyde, where exemplary phenolic resins include phenol-formaldehyde resins; epoxy resins such as those prepared from bisphenol A diepoxide, polyether ether ketones (PEEK), bismaleimides (BMI), nylons such as nylon-6 and nylon 6,6, polycarbonates such as bisphenol A polycarbonate, nitrile-butyl rubber (NBR), hydrogenated nitrile-butyl rubber (HNBR); high fluorine content fluoroelastomers rubbers such as ethylene tetrafluoroethylene (ETFE, available under the tradename Teflon® ETFE), fluorinated ethylene propylene (FEP, available under the tradename Teflon® FEP from DuPont), perfluoroalkoxy (PFA, available under the tradename Teflon® PFA from DuPont), polyvinylidene fluoride (PVDF, available under the tradename Hylar from Solvay Solexis S.p.A.), ethylene chlorotrifluoroethylene (ECTFE, available under the tradename Halar ECTFE from Solvay Solexis S.p.A.), and those in the FKM family and marketed under the tradename VITON® (available from FKM-Industries); and perfluoroelastomers such as polytetrafluoroethylene (PTFE, available under the tradename Teflon® from DuPont), FFKM (also available from FKM-Industries) and also marketed under the tradename KALREZ® perfluoroelastomers (available from DuPont), and VECTOR® adhesives (available from Dexco LP); organopolysiloxanes such as functionalized or unfunctionalized polydimethylsiloxanes (PDMS); tetrafluoroethylene-propylene elastomeric copolymers such as those marketed under the tradename AFLAS® and marketed by Asahi Glass Co.; ethylene-propylene-diene monomer (EPDM) rubbers; polyethylene; polyvinylalcohol (PVA); and the like. Combinations of these polymers may also be used.

In an embodiment, the open cell foam having a base polymer of polyurethane is formed by combining, for example, a diisocyanate and diol described above. A blowing agent can be included to produce the pores for the open cell foam (as discussed below, the open cells of the foam are created by inclusion of nanoparticles with the reactive monomers used to produce the base polymer polyurethane). According to an embodiment, a blowing agent such as water is included with the diol to provide a foam structure due to generation of carbon dioxide from the reaction between diisocyanate and water when the diisocyanate is combined with the water and diol. Alternatively the foam can be formed by other chemical or physical blowing agents. Examples of the blowing agent include hydrochlrorofluorocarbons (e.g., methylene chloride, tetrafluoroethylene, pentafluoropropane, heptafluoropropane, pentafluorobutane, hexafluorobutane, and dichloromonofluoroethane), hydrocarbons (for example, pentane, isopentane, and cyclopentane), carbon dioxide, acetone, and water In a further embodiment, the pores for the open cell foam can be produced by placing the above components in a vacuum chamber and decreasing the pressure below the internal pressure of the forming polyurethane to cause out-gassing of the polymer material.

The density of the foam can be controlled by the amount of water or blowing agent added. The amount of water can be about 0.5 weight percent (wt. %) to about 5.0 wt. %, specifically about 0.5 wt. % to about 4.0 wt. %, and more specifically about 0.5 wt. % to about 3.0 wt. %, based on the weight of the diol (or polyol). Alternatively or additionally, physical blowing agents can be used in amount about 0.5 wt. % to about 15 wt. %, and specifically about 0.5 wt. % to about 10 wt. %, based on the combined weight of the diol (or polyol) and diisocyanate (or polyisocyanate). In an embodiment, physical blowing agents, such as carbon dioxide, can be used in combination with water as a blowing agent.

The nanoparticles may be formulated as a solution or dispersion and cast or coated, or may be mechanically dispersed in a polymer resin matrix. Blending and dispersion of the nanoparticles and the polymer resin may be accomplished by methods such as, for example, extrusion, high shear mixing, rotational mixing, three roll milling, and the like.

Mixing the nanoparticle, which can be derivatized, with a reactive monomer of the base polymer can be accomplished by rotational mixing, or by a reactive injection molding-type process using two or more continuous feed streams, in which the nanoparticles may be included as a component of one of the feed streams (e.g., in polyurethane preparation using different feed streams, the nanoparticles are included in the diisocyanate or polyol, diamine, etc. streams, or in a separate stream as a suspension in a solvent). Mixing in such continuous feed systems is accomplished by the flow within the mixing zone at the point of introduction of the components. The nanoparticles can be mixed with the reactive monomers prior to a two-fold increase in the viscosity of the reactive monomer mixture (i.e., diol and diisocyanate mixture, for example), where including the nanoparticles prior to the increase in viscosity ensures uniform dispersion of the nanoparticles.

The properties of the open cell foam can be adjusted by the selection of the nanoparticles; for example, plate-like derivatized nanographene may be arranged or assembled with the base polymer by taking advantage of the intrinsic surface properties of the nanographene after exfoliation, in addition to the functional groups introduced by derivatization.

In the open cell foam, nanoparticles can be present in an amount of about 0.01 wt. % to about 30 wt. %, specifically about 0.05 wt. % to about 27 wt. %, more specifically about 0.1 wt. % to about 25 wt. %, even more specifically about 0.25 wt. % to about 22 wt. %, and still more specifically about 0.5 wt. % to about 20 wt. %, based on the total weight of the open cell foam.

In a specific embodiment, the open cell foam includes a polyurethane resin, and 0.05 wt. % to 20 wt. % of a nanoparticle based on the total weight of the open cell foam. In another specific embodiment, the open cell foam includes a polyurethane resin, and 0.05 to 20 wt. % of a derivatized nanodiamond based on the total weight of the open cell foam, the derivatized nanodiamond including functional groups comprising carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups.

The polyurethane and derivatized nanoparticles can be formed into a dispersion to facilitate processing. The solvent may be an inorganic solvent such as water, including deionized water, or buffered or pH adjusted water, mineral acid, or a combination comprising at least one of the foregoing, or an organic solvent comprising an alkane, alcohol, ketone, oils, ethers, amides, sulfones, sulfoxides, or a combination comprising at least one of the foregoing.

Exemplary inorganic solvents include water, sulfuric acid, hydrochloric acid, or the like; exemplary oils include mineral oil, silicone oil, or the like; and exemplary organic solvents include alkanes such as hexane, heptane, 2,2,4-trimethylpentane, n-octane, cyclohexane, and the like; alcohols such as methanol, ethanol, propanol, isopropanol, butanol, t-butanol, octanol, cyclohexanol, ethylene glycol, ethylene glycol methyl ether, ethylene glycol ethyl ether, ethylene glycol butyl ether, propylene glycol, propylene glycol methyl ether, propylene glycol ethyl ether, and the like; ketones such as acetone, methyl-ethyl ketone, cyclohexanone methyletherketone, 2-heptanone, and the like; esters such as ethyl acetate, propylene glycol methyl ether acetate, ethyl lactate, and the like; ethers such as tetrahydrofuran, dioxane, and the like; polar aprotic solvents such as N,N-dimethylformamide, N-methylcaprolactam, N-methylpyrrolidine, dimethylsulfoxide, gamma-butyrolactone, or the like; or a combination comprising at least one of the foregoing.

The polyurethane, derivatized nanoparticles, and any solvent may be combined by extrusion, high shear mixing, three-roll mixing, rotational mixing, or solution mixing. In an embodiment, the dispersion may be combined and mixed in a rotational mixer. In this manner, the nanoparticles are uniformly distributed among the polyurethane chains in the open cell foam.

According to an embodiment, the composition containing the reactive monomers and nanoparticles are mixed for about 20 seconds and then disposed in a mold, which is immediately closed by placing a top metal plate on the mold. Due to the significant amount of pressure generated by the foam-forming process, a clamp can be used to hold the top metal plate and mold together to prevent leakage of the foam material from the mold. After about 2 hours, the polyurethane foam material is sufficiently cured such that it can be removed from the mold, i.e., de-molded. Thereafter, in one specific embodiment, the polyurethane foam material is post-cure treated at a temperature of about 100° C. for about 6 hours so that the polyurethane foam material reaches its full strength. Thus in an embodiment, a method of preparing an open cell foam includes combining a diisocyante and diol to form a polymer composition; introducing nanoparticles to the polymer composition; and foaming the polymer composition to produce the open cell foam having nanoparticles exposed within pores of the open cell foam. Here, the nanoparticles can be derivatized with functional groups. In another non-restrictive embodiment, the polymer composition is introduced into a mold prior to curing, cured in a mold; and de-molded to produce a downhole filter comprising the open cell foam.

The polyurethane foam material may have a layer of "skin" on the outside surface of the polyurethane foam. The skin is a layer of solid polyurethane elastomer formed when the mixture containing reactive monomers contacts the mold surface. The thickness of the skin can depend on the concentration of water added to the mixture. Excess water content decreases the thickness of the skin and insufficient water content increases the thickness of the skin. The formation of the skin is believed to be due to the reaction between the isocyanate in the mixture and the moisture on the mold surface. Therefore, additional mechanical conversion processes can be used to remove the skin. Tools such as band saws, miter saws, hack saws, and hot wire filament saws can be used to remove the skin. After removing the skin from the polyurethane foam material, it will have a full open cell structure, excellent elasticity, and very good tear strength.

With regard to the open cells of the foam, without wishing to be bound by theory, it is believed that as gas bubbles are created within the forming polyurethane matrix (either by accumulation of the blowing agent or reaction product carbon dioxide, if present). Defects at the interface of the liquid polyurethane and the gas are produced by the nanoparticles, particularly in the case of derivatized nanoparticles. The defects lower the stability of the bubble formations. These defect sites allow neighboring bubbles to interconnect via channels in the foam without bulk coalescence of large bubble aggregates. Ultimately, a network of interconnected bubbles will be joined to produce an open cell foam as the polyurethane is cured. In an embodiment, since the nanoparticles serve as defect sites that create the open cell structure of the foam, the nanoparticles are disposed not only throughout the polyurethane matrix but also are exposed in the pores of the open cell foam. According to an embodiment, the nanoparticles are uniformly dispersed among chains of the polyurethane within the open cell foam such that a portion of the nanoparticles is unexposed within the pores while a portion of the nanoparticles are exposed in the pores. The interconnected pores (open cells) of the foam form flow paths through the open cell foam.

FIG. 1 shows a cross-section of an open cell foam 100. The open cell foam 100 includes a polyurethane matrix 110 and nanoparticles 120 distributed throughout the polyurethane 110 and exposed by pores 130 that are interconnected by flow channels 140. Although the cross-section shown in FIG. 1 only has a limited number of pores 130 that interconnect, the open cell foam 100 includes a network of interconnected pores 130 that establish numerous flow paths 150 (represented by the dotted curve with an arrow indicating flow direction) across the open cell foam 100 from a first surface 160 to a second surface 170.

According to an embodiment, the size of the pores of the open cell foam is determined by the particle size of the nanoparticles. As used herein, "size of the pores" refers to the largest particle that can be accommodated by the pore. In a non-limiting embodiment, the size of the pores is about 75 µm to about 1000 µm, more specifically about 75 µm to about 850 µm, and more specifically about 75 µm to about 500 µm. Thus, the open cell foam filters particles due to size. In an embodiment, the open cell foam excludes traversal across the open cell foam of particles having a size of greater than 1000 µm, more specifically greater than 500 µm, and more specifically greater than about 50 µm. In another embodiment, the open cell foam allows traversal across the open cell foam of particles having a size of less than or equal to 1000 µm, more specifically less than or equal to 500 µm, even more specifically less than or equal to 100 µm, and even more specifically less than or equal to 0.5 µm.

In an embodiment, the flow rate of fluid across the open cell foam is determined by functional groups attached to the nanoparticles. It will be appreciated that the flow rate is a function of other parameters such as the pore size, geometry of flow paths (which can include linear paths as well as curved paths), liquid viscosity, and the like. In a non-limiting embodiment, the flow rate of fluid through the open cell foam is about 0.5 liter per minute (LPM) to about 7500 LPM, specifically about 1 LPM to about 6000 LPM, more specifically about 1 LPM to about 5000 LPM, and even more specifically about 1 LPM to about 2500 LPM. In particular, the pores of the open cell foam selectively transmit fluids but block flow of particles. Due to the pore density of the open cell foam, even though particles may block certain flow paths through the open cell foam, the flow rate of the open cell foam is maintained at a high value.

With respect to fluid absorption, the functional groups of the derivatized nanoparticles mediate the fluid absorption behavior of the open cell foam. In an embodiment, the nanoparticles, exposed in the pores of the open cell foam, are derivatized with functional groups to selectively transmit non-polar fluids but selectively inhibit transmission of polar fluids through the open cell foam. In a further embodiment, the nanoparticles, exposed in the pores of the open cell foam, are derivatized with functional groups to selectively transmit polar fluids through the downhole filter and selectively inhibit transmission of non-polar fluids through the downhole filter. Although polar and non-polar fluids are specifically mentioned, it will be appreciated that the functional groups of the nanoparticles provide the nanoparticle with surface properties such that the nanoparticles are hydrophilic, hydrophobic, oleholic, olephobic, oxophilic, lipophilic, or a combination of these properties. Thus, the functional groups on the nanoparticles control the selective absorption and transmission of fluids based on these properties. By way of a non-restrictive embodiment, the nanoparticles are hydrophilic and allow flow of aqueous fluids through the open cell foam while inhibiting flow of hydrocarbons.

Figure 2A:
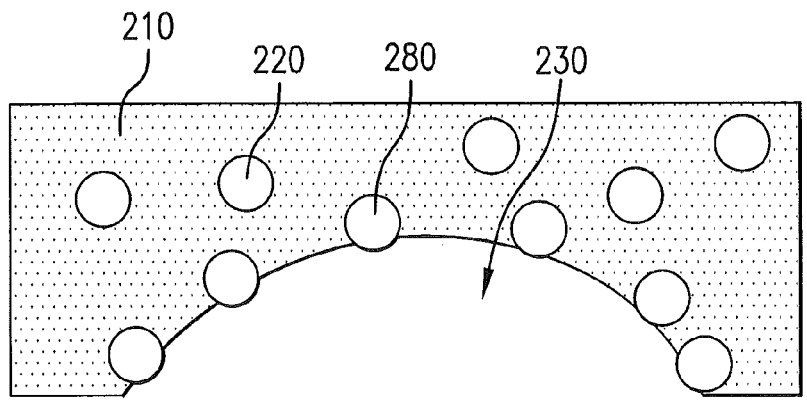
FIG. 2 show cross-sections of open cell foams.
Figure 2B:
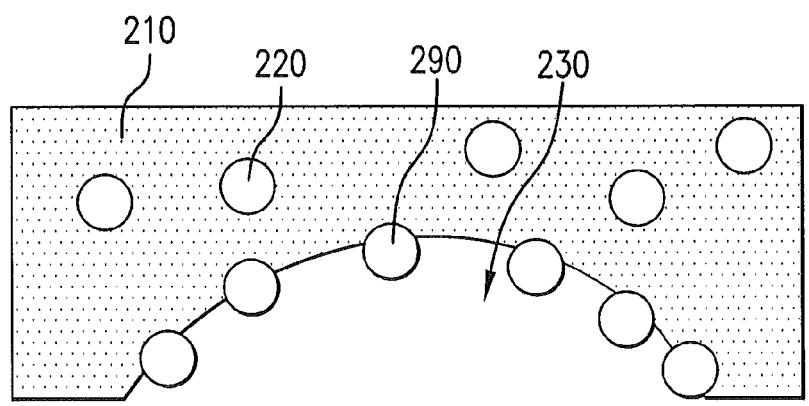
Figure 2C:
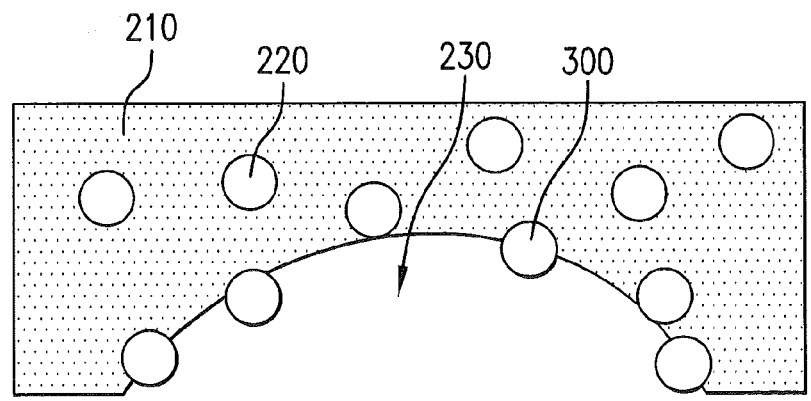

FIG. 2 show the effect of derivatization on the exposure of the nanoparticle within the pores of the open cell foam. Variation of the amount of exposure of the nanoparticles within the pores can affect the size of the pores and selectivity of the pores for fluid absorption and particulate matter filtration. FIG. 2A shows derivatized nanoparticles 220 among polyurethane 210 and derivatized nanoparticles 280 exposed within a pore 230 of an open cell foam. Here, the derivatized nanoparticles 280 are exposed to a small extent, for example, only 20% of the total surface area of the nanoparticle 280 may be present within the pore 230. FIG. 2B shows derivatized nanoparticles 290 that are exposed to a greater extent, for example, 80% of the total surface area of the nanoparticle 290 may be present within the pore 230. FIG. 2C shows a case where derivatized nanoparticles 300 are distributed such that, on average, 50% of the surface area of the nanoparticles 300 is exposed in the pores 230. The relative exposure of the nanoparticles within the pores of the open cell foam can be determined by selection of the functional group attached to the derivatized nanoparticles. When the functional groups interact strongly with the polyurethane matrix, a smaller amount of the surface area of the nanoparticles are exposed within the pores as compared with embodiments where the functional groups interact less strongly with the polyurethane matrix so that a greater amount of the surface area of the nanoparticles are exposed within the pores of the open cell foam. It is believed that the flow rate of a particular fluid through the open cell foam depends on the absolute number of nanoparticles exposed in the pores of the open cell foam as well as the amount of the surface area exposed in the pores. Due to the interaction time of the fluid with the nanoparticles within the pores, the flow rate can vary. Consequently, a highly effective and selective fluid and particle filter is constructed from the open cell foam.

Thus, in an embodiment, a downhole filter comprises the open cell foam and nanoparticles disposed in the open cell foam and exposed within the pores of the open cell foam. Such a downhole filter can be a sandscreen or other article for filtering particles or separating fluids (including gas, liquids, or a combination comprising one of the foregoing).

While one or more embodiments have been shown and described, modifications and substitutions may be made thereto without departing from the spirit and scope of the invention. Accordingly, it is to be understood that the present invention has been described by way of illustrations and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A downhole filter comprising:
an open cell foam; and
nanoparticles disposed in the open cell foam and exposed within pores of the open cell foam,
the nanoparticles being derivatized with a functional group including carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups, and the functional group of the nanoparticles being selected such that the downhole filter selectively transmits polar or non-polar fluids;
wherein the pores are open cells forming flow channels through the open cell foam and the size of the nanoparticles is selected such that the size of the pores of the open cell foam is about 0.75 µm to about 1000 µm.

2. The downhole filter of claim 1, wherein the downhole filter is a sandscreen.

3. The downhole filter of claim 1, wherein the open cell foam comprises polyurethane.

4. The downhole filter of claim 3, wherein the open cell foam further comprises a fluoroelastomer, perfluoroelastomer, hydrogenated nitrile butyl rubber, ethylene-propylene-diene monomer rubber, silicone, epoxy, polyetheretherketone, bismaleimide, polyethylene, polyphenylene sulfide, polyphenylsulfone, polyvinyl alcohol, phenolic resin, polycarbonate, polyester, tetrafluoroethylene-propylene elastomeric copolymer, or a combination comprising at least one of the foregoing.

5. The downhole filter of claim 3, wherein the nanoparticles are uniformly dispersed among chains of the polyurethane within the open cell foam such that a portion of the nanoparticles is unexposed within the pores.

6. The downhole filter of claim 1, wherein the nanoparticles comprise a fullerene, nanotubes, nanographite, nanographene, graphene fiber, polysilsesquioxanes, silica nanoparticles, nano-clay, nanodiamonds, metal particles, ceramic particles, or a combination comprising at least one of the foregoing nanoparticles.

7. The downhole filter of claim 6, wherein the metal particles include iron, tin, titanium, platinum, palladium, cobalt, nickel, vanadium, alloys thereof, or a combination comprising at least one of the foregoing.

8. The downhole filter of claim 1, wherein the functional group is ionic.

9. The downhole filter of claim 1, wherein the nanoparticles are hydrophilic, hydrophobic, oleholic, olephobic, oxophilic, lipophilic, or a combination of these properties.

10. The downhole filter of claim 1, where the functional group is amine, and the nanoparticles are present in an amount of about 0.01 wt. % to about 20 wt. %, based on the weight of the open cell foam.

11. The downhole filter of claim 1, wherein the derivatized nanoparticles comprise Janus particles.

12. The downhole filter of claim 1, further comprising a surfactant to stabilize the nanoparticles.

13. The downhole filter of claim 1, wherein the open cell foam further comprises a filler including carbon black, mica, clay, glass fiber, carbon fiber, or a combination comprising at least one of the foregoing fillers.

14. The downhole filter of claim 1, wherein the open cell foam excludes traversal across the downhole filter of downhole particles having a size greater than 500 μm.

15. The downhole filter of claim 1, wherein the open cell foam allows traversal across the downhole filter of downhole particles having a size of less than or equal to 500 μm.

16. The downhole filter of claim 1, wherein the nanoparticles are present in an amount of about 0.01 wt. % to about 20 wt. %, based on the weight of the open cell foam.

17. The downhole filter of claim 1, wherein a flow rate of a fluid across the downhole filter is determined by functional groups attached to the nanoparticles.

18. The downhole filter of claim 1, wherein a flow rate of a fluid through the downhole filter is about 1 liter per minute (LPM) to about 5000 LPM.

19. The downhole filter of claim 1, wherein the pores of the open cell foam selectively transmit downhole fluids but block production of downhole particles.

20. The downhole filter of claim 1, wherein the nanoparticles, exposed in the pores of the open cell foam, are derivatized with functional groups to selectively transmit non-polar fluids through the downhole filter.

21. The downhole filter of claim 20, wherein the nanoparticles, exposed in the pores of the open cell foam, are derivatized with functional groups to selectively inhibit transmission of polar fluids through the downhole filter.

22. The downhole filter of claim 1, wherein the nanoparticles, exposed in the pores of the open cell foam, are derivatized with functional groups to selectively transmit polar fluids through the downhole filter.

23. The downhole filter of claim 20, wherein the nanoparticles, exposed in the pores of the open cell foam, are derivatized with functional groups to selectively inhibit transmission of non-polar fluids through the downhole filter.

24. A method of preparing the downhole filter of claim 1, the method comprising:
combining a polyisocyanate and polyol to form a polymer composition;
introducing nanoparticles into the polymer composition; and
foaming the polymer composition to produce the downhole filter comprising an open cell foam having nanoparticles exposed within pores of the open cell foam,
the nanoparticles being derivatized with a functional group including carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups, and the functional group of the nanoparticles being selected such that the downhole filter selectively transmit polar or non-polar fluids,
wherein the pores are open cells forming flow channels through the open cell foam and the size of the nanoparticles is selected such that the size of the pores of the open cell foam is about 0.75 μm to about 1000 μm.

25. The downhole filter of claim 1, wherein the nanoparticles have an average particle size of about 0.5 nm to about 500 nm.

26. The downhole filter of claim 1, wherein
the nanoparticles have an average particle size of about 0.5 nm to about 500 nm, and
comprise a fullerene, nanotubes, nanographite, polysilsesquioxanes, silica nanoparticles, nano-clay, nanodiamonds, metal particles, ceramic particles, or a combination comprising at least one of the foregoing nanoparticles.

* * * * *